(12) United States Patent
Johnson, Jr.

(10) Patent No.: US 9,340,079 B2
(45) Date of Patent: May 17, 2016

(54) BRAKE ACTUATOR HITCH FOR A TOWED VEHICLE

(71) Applicant: Howard Conwell Johnson, Jr., Lexington, TX (US)

(72) Inventor: Howard Conwell Johnson, Jr., Lexington, TX (US)

( * ) Notice: Subject to any disclaimer, the term of this patent is extended or adjusted under 35 U.S.C. 154(b) by 0 days.

(21) Appl. No.: 14/298,871

(22) Filed: Jun. 6, 2014

(65) Prior Publication Data

US 2014/0367943 A1 Dec. 18, 2014

Related U.S. Application Data

(60) Provisional application No. 61/832,283, filed on Jun. 7, 2013.

(51) Int. Cl.
*B60T 7/20* (2006.01)
*B60D 1/24* (2006.01)

(52) U.S. Cl.
CPC ........................ *B60D 1/242* (2013.01)

(58) Field of Classification Search
USPC .............................. 188/3 R, 112 R; 280/457
See application file for complete search history.

(56) References Cited

U.S. PATENT DOCUMENTS

| | | |
|---|---|---|
| 2,000,999 A | 5/1935 | Suchland |
| 2,070,884 A | 2/1937 | Claus |
| 2,129,728 A | 9/1938 | Berg |
| 2,522,855 A | 9/1950 | Brown |
| 3,204,725 A | 9/1965 | McGraw, Jr. |
| 3,318,422 A | 5/1967 | Frescura |
| 5,195,768 A | 3/1993 | Hendrix |
| 5,246,243 A | 9/1993 | Carr |
| 5,431,253 A | 7/1995 | Hargrove |
| 6,264,228 B1 | 7/2001 | Westervelt |
| 6,609,766 B1 | 8/2003 | Chesnut |
| 6,626,504 B2 | 9/2003 | Harner et al. |
| 6,644,761 B2 | 11/2003 | Schuck |
| 6,959,793 B2 | 11/2005 | Cinquemani |
| 7,059,455 B2 | 6/2006 | Savaria |
| 7,699,406 B1 | 4/2010 | Fredrick, II |

*Primary Examiner* — Christopher Schwartz

(57) ABSTRACT

An apparatus and method are described for a brake actuator hitch. The brake actuator hitch is configured to be connected to a tow vehicle receiver and a towed vehicle and includes mechanical linkage to actuate a brake pedal of the towed vehicle when there is a difference between relative motions of the brake actuator hitch and the tow vehicle receiver.

3 Claims, 6 Drawing Sheets

BRAKE ACTUATOR HITCH FOR A TOWED VEHICLE

CROSS REFERENCE TO RELATED APPLICATION

This application claims the benefit of priority of U.S. Provisional Patent Application No. 61/832,283 filed Jun. 7, 2013, which is hereby incorporated by reference herein in its entirety.

TECHNICAL FIELD

This application relates to a method and system for braking a towed vehicle.

BACKGROUND

Owners of recreational vehicles such as motor homes often tow a smaller vehicle, such as a car, for use once they have reached their destination. It is highly desirable to actuate the brakes of the towed vehicle when the towing vehicle slows down. If the brakes of the towed vehicle are not actuated there is a significant increase in the stopping distance of the vehicles, the ability to control the towed vehicle is degraded, and there is a potential for damage to the towing vehicle. This invention provides the braking function, is light weight to handle, is simple and low maintenance.

Prior art systems are complex, prone to failure and more difficult to install. In most cases there is a need to ensure that an electrical, hydraulic, or vacuum connection between the towed vehicle and the towing vehicle is securely maintained, which presents many opportunities for failure and complicates the procedure for attaching and releasing the towed vehicle from the towing vehicle.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

The present disclosure will be understood more fully from the detailed description given below and from the accompanying drawings of various embodiments of the present disclosure, which, however, should not be taken to limit the present disclosure to the specific embodiments, but are for explanation and understanding only.

In various embodiments, the present invention provides a braking function using a mechanical linkage to actuate the brakes of the towed vehicle when the towing vehicle slows down and to release the brakes when accelerating, cruising, or coasting. The braking force, proportional to the relative displacement or motion between the vehicles, is automatically reduced as the towed vehicles deceleration approaches that of the towing vehicle. The brake actuator uses the towed vehicle's own brake pedal to actuate the towed vehicle brakes. The brake actuator fits into the towing vehicles trailer hitch receiver with no modifications. The towed vehicle may be attached to the tow vehicle by a standard or custom made tow bar and the brake actuator is attached to the towed vehicle brake pedal by a cable. The embodiments described herein illustrate a system that is fundamentally stable and needs no additional active damping, resistance or activation force.

Figure 1A:
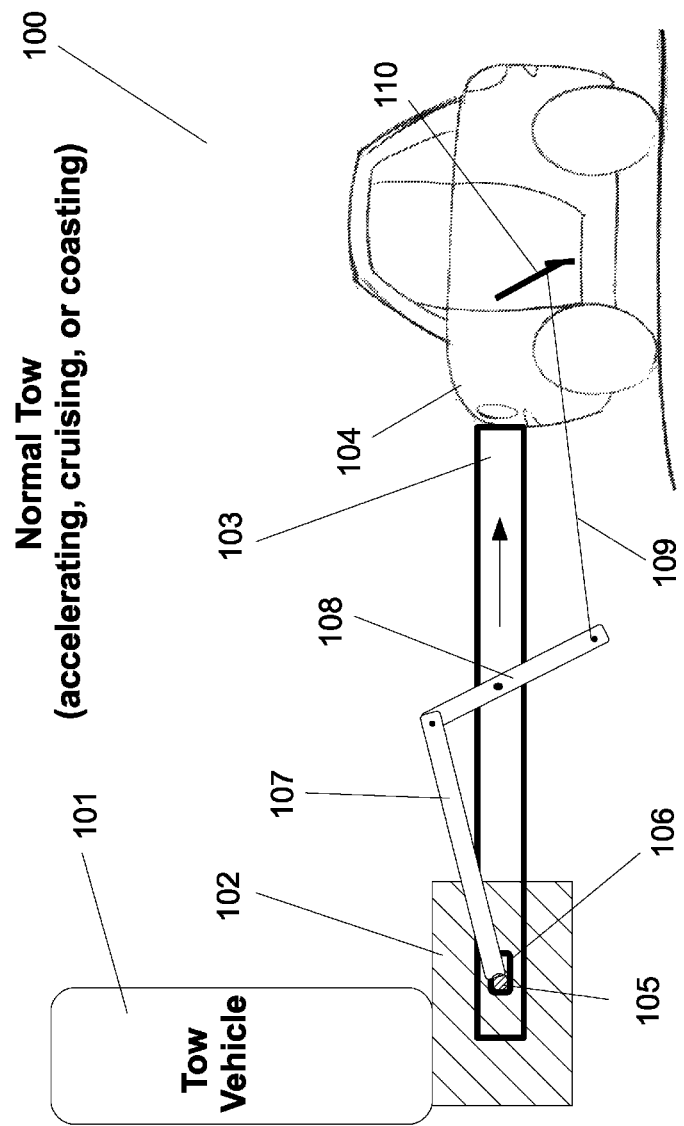
FIG. 1A and FIG. 1B are pictorial representations of a brake actuator hitch 100 illustrating an embodiment of the operation of a brake actuator hitch during normal towing and braking.
Figure 1B:
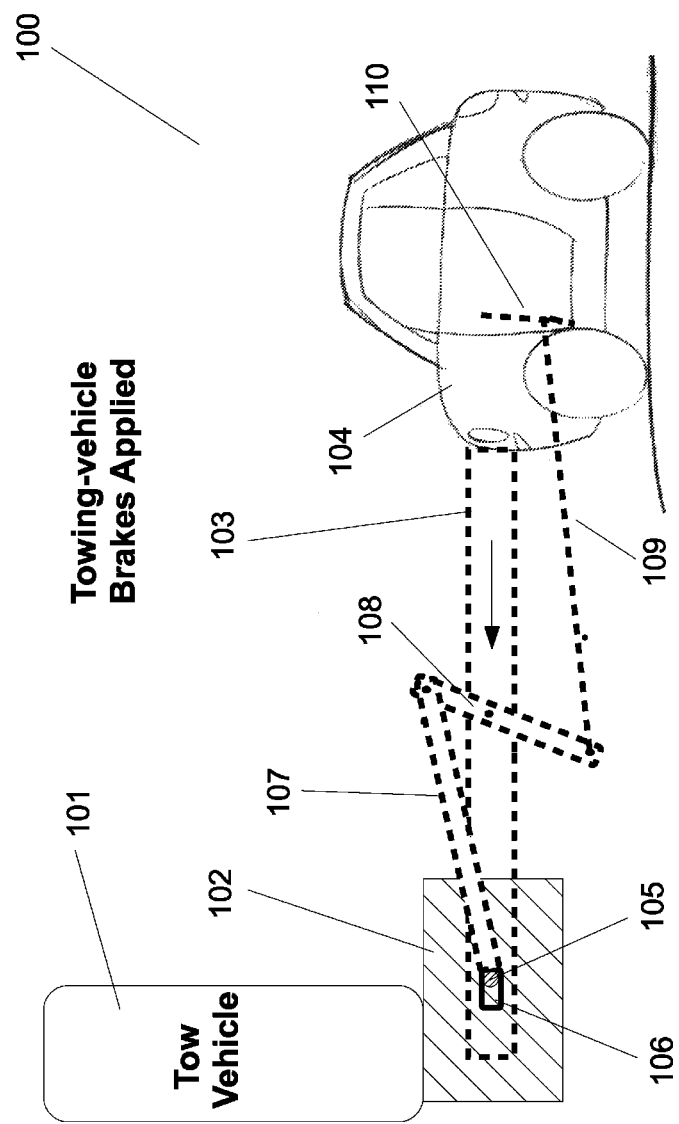

FIG. 1A and FIG. 1B are pictorial representations of a brake actuator hitch 100 illustrating an embodiment of the operation of a brake actuator hitch during normal towing and braking The towing vehicle 101 has a standard towing vehicle receiver 102, as commonly known in the art, attached to it. The ball hitch/tow bar 103 (represented here as a single unit) attach the towed vehicle 104 to the towing vehicle receiver 102. The ball hitch/tow bar 103 has an elongated hole or slot 106 for the hitch pin 105 to allow front to back motion of the towed vehicle 104 with respect to the towing vehicle 101 and towing vehicle receiver 102.

Referring to FIG. 1A, during tow (accelerating, cruising, or coasting) the ball hitch/tow bar 103 is pulling the towed vehicle 104, the ball hitch/tow bar 103 is back in the slot 106 and the push rod 107, lever 108, brake connector 109, and towed vehicle 104 brake pedal 110 are in the neutral position and the towed vehicle brakes are not engaged, as depicted with solid lines).

Referring to FIG. 1B, when the towing vehicle brakes are applied, the inertia of the towed vehicle causes the ball hitch/tow bar 103 to slide forward in slot 106 and the push rod 107, moves the lever 108, brake connector 109, and towed vehicle 104 brake pedal 110 into the braking position as depicted by dotted lines to brake the towed vehicle 104. As the towed vehicle 104 decelerates, it causes the ball hitch/tow bar 103 to slide back toward the neutral position. As the ball hitch/tow bar 103 slides back to the neutral position it reduces and eliminates the application of the brake pedal 110.

Brake connector 109 may be any connection means that would effect the actuation of the brake pedal as described in the embodiments set forth herein. For example, the brake connector may be but not limited to being flexible or rigid, such as a cable, rope, or rod or various materials and configurations. For convenience, hereafter it will be referred to as a cable, however it is not to be construed as limited to such.

Ball hitch/tow bar 103 is illustrated by way of example as a single member. In the embodiments that follow in FIGS. 2 through 5 the brake actuator hitch comprises an integrated ball hitch and tongue that couples to a tow vehicle receiver, and may be independent of a tow bar that provides the towing connection between the towed vehicle and the coupled brake actuator hitch.

Figure 2:
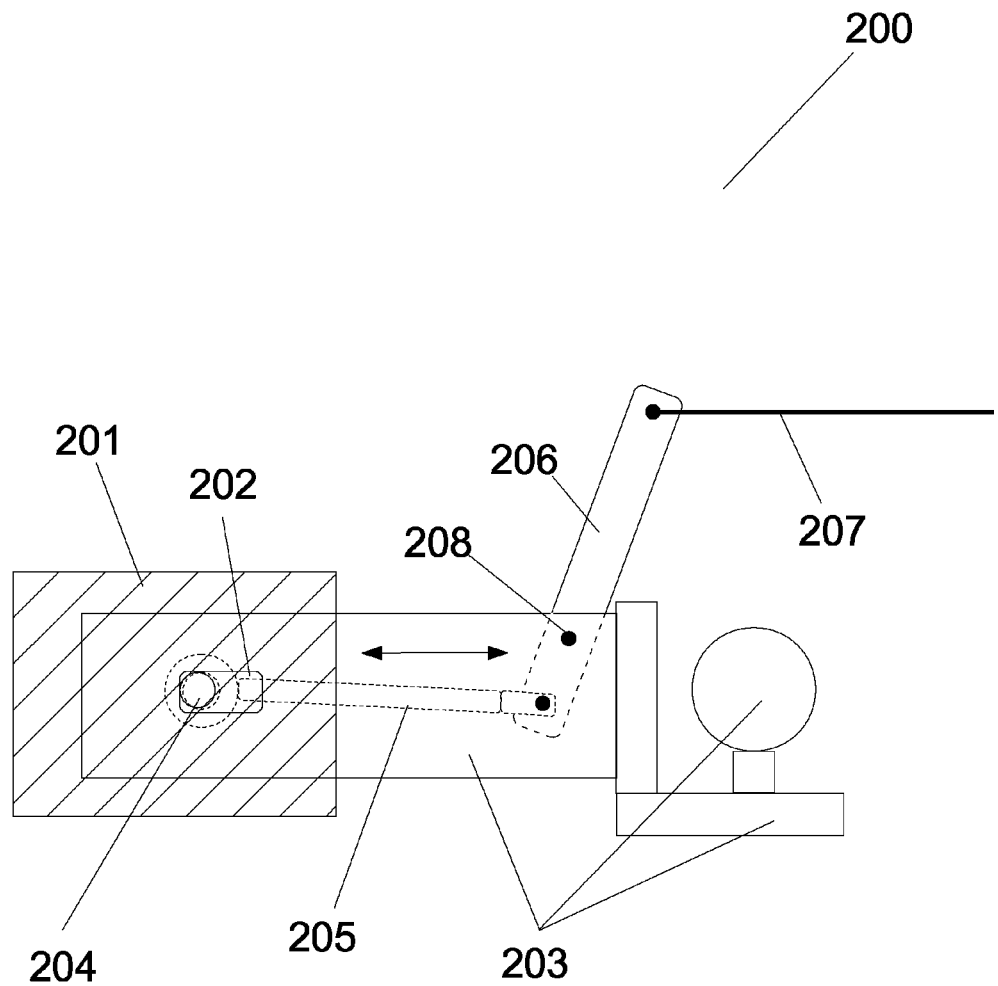
FIG. 2 is an illustration of an embodiment of a brake actuator hitch 200 including the parts of the brake actuator in a standard ball hitch.

FIG. 2 shows an embodiment of a brake actuator hitch 200 for a standard hitch configuration that operates in a fashion similar to that illustrated in FIG. 1. In one embodiment, the push rod 205 is coupled to the hitch pin 204, which couples the ball hitch 203 to the towing receiver 201, as shown in FIG. 2. For example, when the towing vehicle brakes, the inertia of the towed vehicle causes the ball hitch 203 to slide forward in the slot 202 to activate the push rod 205 located inside the ball hitch 203. The push rod 205 is fixed to the towing receiver 201 by the hitch pin 204 and provides force to the lever 206. In one embodiment, the lever 206 pivots on a pin 208 inside the ball hitch and and at least partially protrudes through the top of the ball hitch 203, pulls the attached brake pedal cable 207 to brake the towed vehicle. As the towed vehicle slows, the ball hitch 203 slides backward in the slot 202 to reduce and eliminate the towed vehicle braking.

Figure 3:
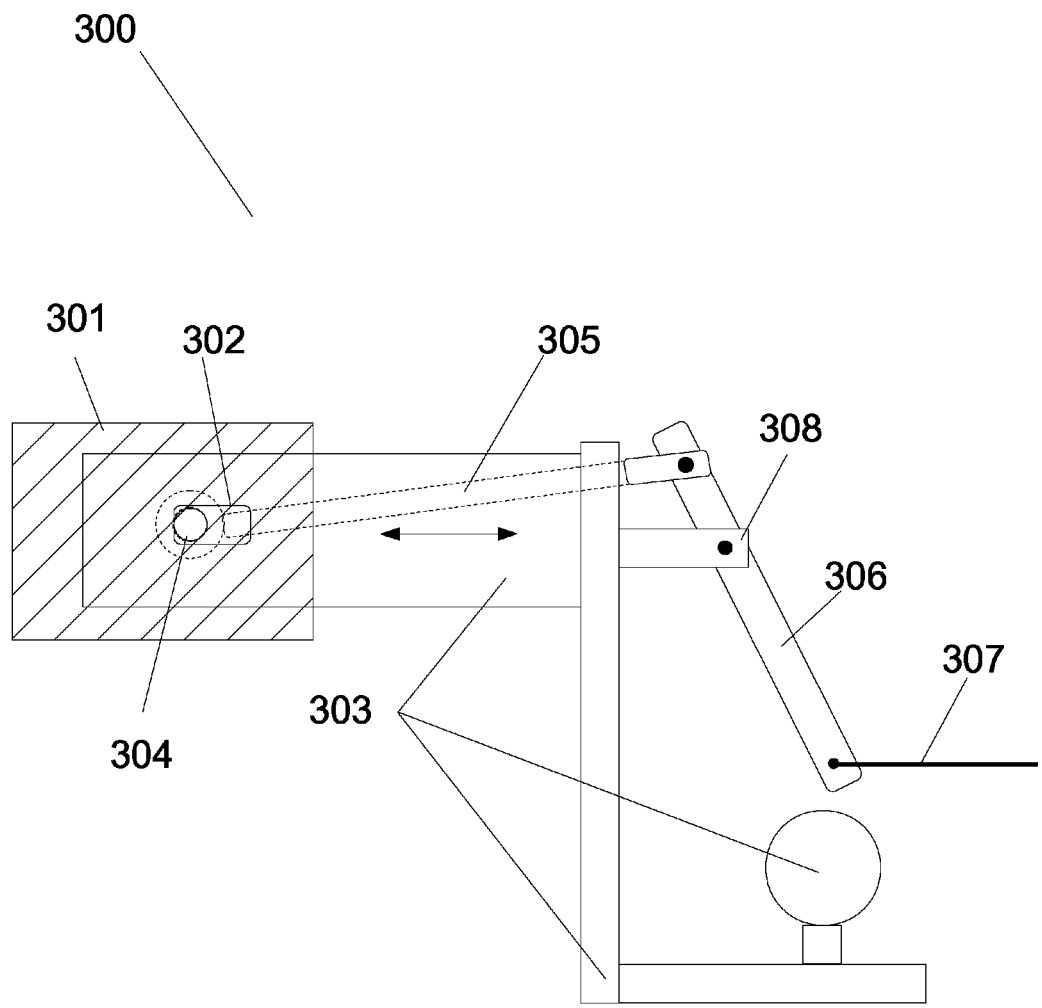
FIG. 3 is an illustration of an embodiment of a brake actuator hitch 300 including the parts of the brake actuator in a drop down ball hitch.

FIG. 3 shows an embodiment of a brake actuator hitch 300 for a drop down hitch configuration that operates in a fashion similar to that illustrated in FIG. 1. While towing, the ball hitch 303 is restrained by the hitch pin 304 fixed to the towing vehicle receiver 301. When the towing vehicle decelerates, the inertia of the towed vehicle causes the ball hitch 303 to slide forward in the slot 302 and activate the push rod 305, which in one embodiment is located inside the ball hitch 303 as shown. The push rod 305 is fixed to the towing vehicle receiver 301 by the hitch pin 304 and, protruding through the ball hitch, provides force to the lever 306. The lever 306 is coupled to and pivots on clevis 308 attached to the ball hitch 303 which in turn pulls the attached brake pedal cable 307 to brake the towed vehicle. As the towed vehicle slows, the ball hitch 303 slides backward in the slot 302 to reduce and eliminate the towed vehicle braking.

Figure 4:
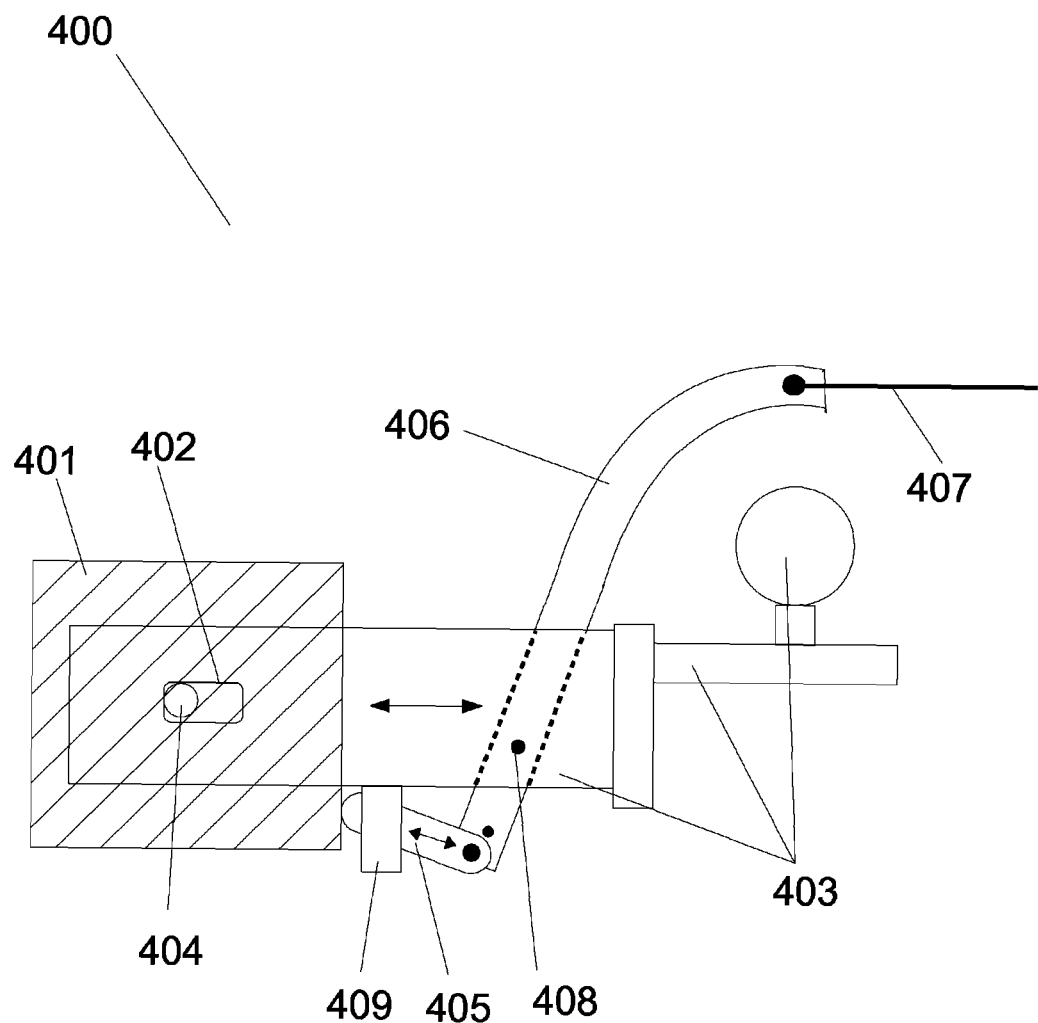
FIG. 4 is an illustration of an embodiment of a brake actuator hitch 400 including the parts of the brake actuator in a standard ball hitch.

FIG. 4 shows another embodiment of a brake actuator hitch 400 for a standard hitch configuration that operates in a fashion similar to that illustrated in FIG. 1. While towing, the ball hitch 403 is restrained by the hitch pin 404 fixed to the towing vehicle receiver 401. When the towing vehicle (not shown) decelerates, the inertia of the towed vehicle causes the ball hitch 403 to slide forward in its slot 402, activating the push rod 405 protruding through guide 409 attached to the ball hitch 403 and abutted against the towing vehicle receiver 401, providing force to the lever 406. The lever 406 protrudes through the ball hitch 403 pivoting on pin 408 inside the ball hitch 403 and pulling the attached brake pedal cable 407, braking the towed vehicle. As the towed vehicle slows, the ball hitch 403 corrects back in the slot 402 to reduce and eliminate the towed vehicle braking.

Figure 5:
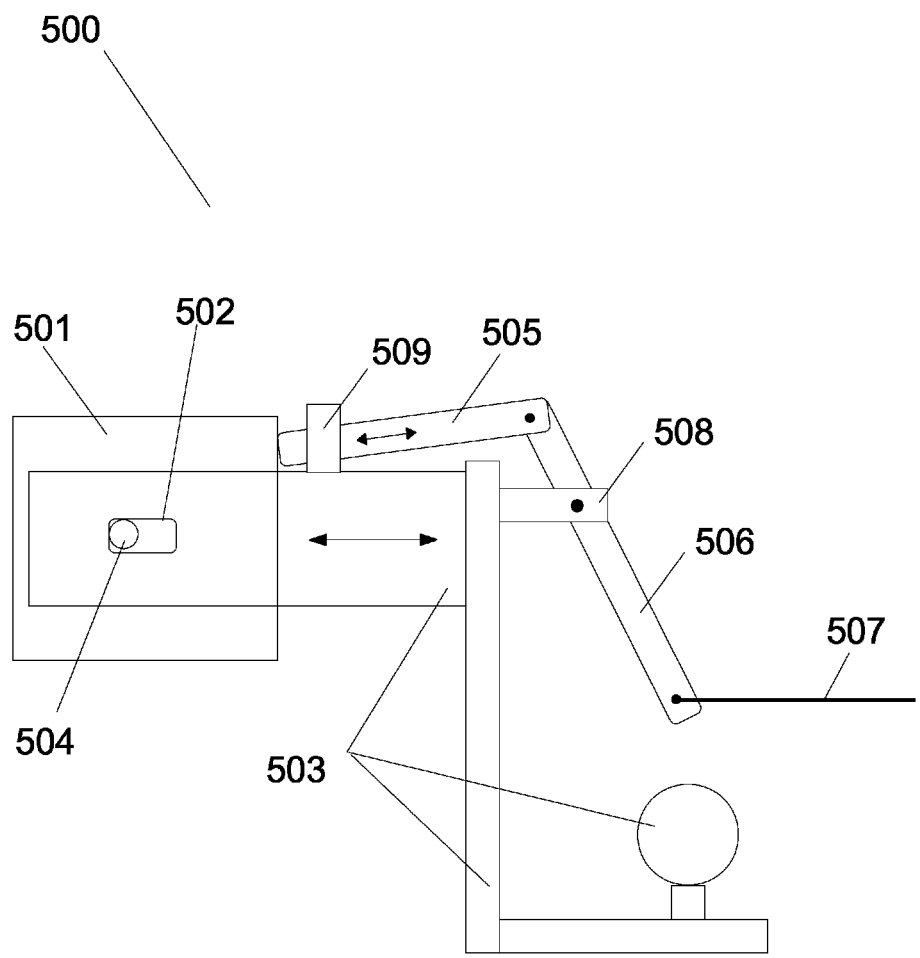
FIG. 5 is an illustration of an embodiment of a brake actuator hitch 500 including the parts of the brake actuator in a drop down ball hitch.

FIG. 5 shows another embodiment of a brake actuator hitch 500 for a drop down hitch configuration. While towing, the ball hitch 503 is restrained by the hitch pin 504 fixed to the towing vehicle receiver 501. In one embodiment, when the towing vehicle decelerates, the inertia of the towed vehicle causes the ball hitch 503 to slide forward in its slot 502, activating the push rod 505, protruding through guide 509 attached to the ball hitch 503 and abutted against the towing vehicle receiver 501 providing force to the lever 506. The lever 506 pivots on clevis 508 attached to the ball hitch 503 pulling the attached brake pedal cable 507, braking the towed vehicle. As the towed vehicle slows, the ball hitch 503 corrects back in the slot 502 to reduce and eliminate the towed vehicle braking.

In various embodiments, there may be a multitude of combinations for the slot (e.g., 105, 202, etc.) width and the various elements of the mechanical linkage coupled between the ball hitch and towed vehicle, such as the push rod (e.g., 107, 205, etc.), lever (e.g., 108, 206, etc.), and cable (e.g., 207, 307, etc.), including the attachment of the cable to the brake pedal (e.g., 110) to brake the towed vehicle (e.g., 104) as set forth in the embodiments described above. For example, in FIG. 1 the lever 108 length may be adjustable to provide a greater or lesser movement of the cable (e.g., to position 111) to accommodate various connecting points or variations of the brake pedal 110. In another example the push rod 205 may be coupled to the towing receiver 201 in various ways, for example, attached to the hitch pin 204 or directly abutted to the towing vehicle receiver 201 so long as it is configured to maintain position relative to the towing vehicle receiver 201 as the ball hitch 203 slides in conjunction with the relative motion of the towing and towed vehicles during deceleration and acceleration of the tow vehicle as described with respect to FIG. 1.

Further, the exact shape of the parts may not be critical to some or all embodiments contemplated herein. With respect to the embodiments of the above description, the optimum dimensional relationships for the parts may include variations in size, materials, shape, form, function and manner of operation, assembly and use. A person of ordinary skill in the art would appreciate that these combinations and variations of part dimensions and arrangements may also apply to any of the embodiments described herein.

The above description sets forth numerous specific details such as examples of specific systems, components, methods and so forth, in order to provide a good understanding of several embodiments of the present disclosure. It will be apparent to one of ordinary skill in the art, however, that at least some embodiments of the present disclosure may be practiced without these specific details. In other instances, well known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure. Accordingly, the present examples are to be considered as illustrative and not restrictive.

What is claimed is:

1. An apparatus to brake a towed vehicle when there is a difference between relative motions of the towed vehicle and a hitch coupled to a tow vehicle receiver of a towing vehicle, the apparatus comprising:
    a push rod physically coupled to the tow vehicle receiver and a lever physically coupled to the push rod and the hitch, each configured to operate external to the hitch and entirely above the portion of the hitch configured to couple the towed vehicle to two vehicle receiver; and
    a brake connector to physically couple the lever to the brake pedal.

2. The apparatus of claim 1, wherein the hitch includes a ball hitch.

3. The apparatus of claim 1, wherein the brake connector is a cable configured to include a first end to connect to one the lever and a second end to connect to the brake pedal.

* * * * *